United States Patent [19]

Matsuba et al.

[11] Patent Number: 5,093,420
[45] Date of Patent: Mar. 3, 1992

[54] VINYL CHLORIDE RESIN COMPOSITION

[75] Inventors: Kuniyoshi Matsuba, Kakogawa; Toshihiko Hasegawa, Hyogo; Hideki Hosoi, Kobe, all of Japan

[73] Assignee: Kanegafuchi Kagaku Kogyo Kabushiki Kaisha, Osaka, Japan

[21] Appl. No.: 506,130

[22] Filed: Apr. 9, 1990

[30] Foreign Application Priority Data

Apr. 12, 1989 [JP] Japan ................. 1-93769

[51] Int. Cl.$^5$ .................. C08L 27/06; C08L 33/12; C08L 51/00
[52] U.S. Cl. ......................... 525/85; 525/80
[58] Field of Search ..................... 525/85, 80

[56] References Cited

U.S. PATENT DOCUMENTS

| | | | |
|---|---|---|---|
| 4,052,482 | 10/1977 | Ide | 260/876 |
| 4,268,636 | 5/1981 | Iizuka et al. | 525/85 |

FOREIGN PATENT DOCUMENTS

| | | |
|---|---|---|
| 40-5311 | 3/1965 | Japan . |
| 52-49020 | 12/1977 | Japan . |
| 53-2898 | 2/1978 | Japan . |
| 1378434 | 12/1974 | United Kingdom . |

*Primary Examiner*—Melvyn I. Marquis
*Assistant Examiner*—David Buttner
*Attorney, Agent, or Firm*—Armstrong, Nikaido, Marmelstein, Kubovcik & Murray

[57] ABSTRACT

A vinyl chloride resin composition including: (1) 100 parts by weight of a vinyl chloride resin and (2) 0.1 to 30 parts by weight of a two-stage polymer, said polymer (2) being prepared by emulsion-polymerizing 60 to 95 parts by weight of a monomer mixture (A) of 50 to 95% by weight of methyl methacrylate, 5 to 50% by weight of an alkyl methacrylate with a $C_2$ to $C_8$ alkyl group and 0 to 20% by weight of a vinyl monomer to give a polymer latex and then polymerizing 40 to 5 parts by weight of a monomer mixture (B) of 20 to 80% by weight of an alkyl acrylate and/or an alkyl methacrylate other than methyl methacrylate, 80 to 20% by weight of methyl methacrylate and 0 to 20% by weight of a vinyl monomer in the presence of said polymer latex, said polymer (2) having a particle size of not more than 1000 Å in the latex, and a specific viscosity at 30° C. of the solution wherein 0.4 g of said polymer (2) is dissolved in 100 ml of benzene of 1 or more. The composition is excellent in transparency and secondary processability as well as in processability. Thus, a composition having excellent properties can be prepared by admixing a small amount, such as 0.1 to 30 parts by weight of the two-stage polymer as the agent for improving the processability with 100 parts by weight of the vinyl chloride resin.

3 Claims, No Drawings

VINYL CHLORIDE RESIN COMPOSITION

BACKGROUND OF THE INVENTION

The present invention relates to a vinyl chloride resin composition having excellent gelation property and transparency, and more particularly to a vinyl chloride resin composition comprising a vinyl chloride resin and a two-stage polymer with a high molecular weight, mainly composed of methyl methacrylate and an alkyl methacrylate with a $C_2$–$C_8$ alkyl group as main components.

Polyvinyl chloride resins have been widely used because of their excellent physical properties and chemical properties. However, they are poor in processability, that is, their processing temperatures are close to their thermal decomposition temperature and moreover it takes a long time to form into a molten state, so it is difficult to process them. Also, when they are subjected to extrusion, the surfaces of the obtained product are bad, when they are subjected to calendering they are insufficiently melt-kneaded, and furthermore, their secondary processability is poor.

In order to improve the above-mentioned defects, many studies have been made and various techniques have been disclosed. For instance, there are methods using a plasticizer, methods wherein the vinyl chloride is copolymerized with another monomer, methods wherein polyvinyl chloride is mixed with another resin (polymer), and the like.

However, according to any of these methods, it is impossible that the processability of the polyvinyl chloride resin can be sufficiently improved while keeping the excellent physical properties and chemical properties that the vinyl chloride resin itself processes originally.

For instance, as to the method using the plasticizer and the copolymerizing method with the other monomer, the physical properties of the obtained product are greatly different from these of the product prepared from the polyvinyl chloride resin alone. Also, as to the mixing method with the other polymer, many of them are techniques wherein the processing temperature of the polyvinyl chloride is lowered by lowering the melt viscosity of the polyvinyl chloride. According to the method, though it appears that the fluidity of the polyvinyl chloride can be improved, the fact is that the polyvinyl chloride is insufficiently mixed with the other polymer since energy is not consumed for mixing the polyvinyl chloride with the other polymer but consumed for letting the polyvinyl chloride flow, thus resulting in insufficient gelation of the polyvinyl chloride. Accordingly, the products obtained therefrom are seemingly transparent but they are inferior in physical properties to products prepared from the polyvinyl chloride sufficiently gelled.

For solving the above-mentioned defects, there is adopted a method wherein a copolymer with a relatively high molecular weight, containing methyl methacrylate as a main component (hereinafter referred to as "agent for improving processability") is added to the polyvinyl chloride, as disclosed in Japanese Examined Patent Publication No. 40-5311. According to the method, the agent for improving processability which is not gelled easily remains as the so-called fish eyes, so the obtained product has the dirty surface.

For improving the defect, Japanese Examined Patent Publication No. 52-49020 and No. 53-2898 disclose that agents for processability are prepared according to a multi-stage copolymerization method. According to the methods, for obtaining the satisfactory effect, a relatively large amount of the agent for improving processability must be added to the polyvinyl chloride. Accordingly, it is required to develop agents for improving processability which can exhibit the desired improving effect by the addition of a small amount.

As discussed in Japanese Examined Patent Publication No. 40-5311, it has hitherto been well known that a copolymer having a high molecular weight and containing methyl methacrylate as the main component is added to the vinyl chloride resin to improve the processability of the polyvinyl chloride resin. It can be easily persumed that the higher the molecular weight of the agent for improving processability, the more excellent the improving effect. However, when adding an agent for improving processability that only its molecular weight is merely increased to the vinyl chloride resin, the obtained product is not always put to practical use. Because, as to such an agent, there is a case that not only the transparency of the product is lowered but also the degree of gelation of the vinyl chloride resin is reduced and the secondary processability, such as elongation at a high temperature, becomes poor.

The cause, though it is not clear in detail how the fine structure of the agent for improving processability in the final composition influences the improvement of the processability of the vinyl chloride resin, can be considered that the dispersibility of the agent for improving processability is lowered by making the molecular weight higher.

An object of the present invention is to provide a polyvinyl chloride resin composition having excellent processability as well as the excellent properties that the vinyl chloride resin itself possesses originally.

This and the other objects of the present invention will become apparent from the following description hereinafter.

SUMMARY OF THE INVENTION

An earnest study has been made as to an agent for improving processability which can improve the gelation property of the vinyl chloride resin by the addition of a small amount to remarkably improve the processability, from the viewpoints of compositions and preparation processes. As a result, it has been found that when a copolymer containing methyl methacrylate as a main component, having a specific composition and having a high molecular weight, furthermore, having a polymer particle size of the latex of not more than 1000 Å is used as the agent for improving processability of the polyvinyl chloride resin, the above-mentioned object can be attained.

In accordance with the present invention, there is provided a vinyl chloride resin composition comprising:

(1) 100 parts by weight of a vinyl chloride resin and (2) 0.1 to 30 parts by weight of a two-stage polymer, the polymer (2) being prepared by emulsion-polymerizing 60 to 95 parts by weight of a monomer mixture (A) of 50 to 95% by weight of methyl methacrylate, 5 to 50% by weight of an alkyl methacrylate with a $C_2$ to $C_8$ alkyl group and 0 to 20% by weight of a vinyl monomer copolymerizable therewith to give a polymer latex and then polymerizing 40 to 5 parts by weight of a monomer mixture (B) of 20 to 80% by weight of at least one monomer selected from the group consisting of an alkyl acrylate and an alkyl methacrylate other than methyl methacrylate, 80 to 20% by weight of methyl methacrylate and 0 to 20% by weight of a vinyl monomer copolymerizable therewith in the presence of said polymer latex, the total amount of the monomer mixture (A) and the monomer mixture (B) being 100 parts by weight; said polymer (2) having a polymer particle size of the latex of not more than 1000 Å, and a specific viscosity at 30° C. of the solution wherein 0.4 g of said polymer (2) is dissolved in 100 m: of benzene of 1 or more.

DETAILED DESCRIPTION

In the present invention, the vinyl chloride resins (1) are not particularly limited, and any of those generally called vinyl chloride resins or polymers, polyvinyl chloride resins or the like can be used. Examples of the vinyl chloride resin (1) are, for instance, vinyl chloride homopolymer, vinyl chloride copolymers having a vinyl chloride content of at least about 80% by weight with a copolymerizable monomer therewith, such as vinyl acetate, propylene, styrene or an acrylic ester, postchlorinated polyvinyl chloride, and the like. They may be used alone or as an admixture thereof.

In the present invention, the polymer (2) prepared in a two-stage polymerization (two-stage polymer) is used in addition to the vinyl chloride resin (1). The two-stage polymer (2) is prepared by polymerizing the monomer mixture (B) in the presence of the polymer latex prepared from the monomer mixture (A).

The monomer mixture (A) from which a part of the two-stage polymer (2) is prepared is a mixture of methyl methacrylate and an alkyl methacrylate having an alkyl group with 2 to 8 carbon atoms, and if necessary, a vinyl monomer copolymerizable with methyl methacrylate and the alkyl methacrylate.

Only the copolymer wherein a specific amount of the alkyl methacrylate having $C_2-C_8$ alkyl group is copolymerized with methyl methacrylate can solve the problem that the transparency and the secondary processability become poor with the increase of the molecular weight of the methyl methacrylate copolymer. Such an effect has not hitherto been known. Also, the higher the specific viscosity of the two-stage polymer (2), the more excellent the effect obtained by copolymerizing the alkyl methacrylate as mentioned above.

The amount of methyl methacrylate in the monomer mixture (A) is from 50 to 95% by weight, preferably from 50 to 85% by weight, more preferably from 60 to 80% by weight. When the amount of methyl methacrylate in the monomer mixture (A) is less than 50% by weight, or more than 95% by weight, the transparency, the secondary processability and the gelation property are lowered.

The alkyl methacrylate in the monomer mixture (A) has an alkyl group having 2 to 8, preferably 2 to 4, carbon atoms. From the viewpoint of transparency, the gelation property and the secondary processability, butyl methacrylate is the most preferable one. When the number of carbon atoms of the alkyl group in the alkyl methacrylate is 9 or more, the transparency and the gelation property remarkably are lowered. The alkyl methacrylate may be used alone or as an admixture thereof. The amount of the alkyl methacrylate in the monomer mixture (A) is from 5 to 50% by weight, preferably from 15 to 50% by weight, more preferably from 20 to 40% by weight.

The monomer mixture (A) of methyl methacrylate and the alkyl methacrylate with $C_{2-C8}$ alkyl group may contain a vinyl monomer copolymerizable therewith within the range of 0 to 20% by weight, preferably from 0 to 10% by weight. The vinyl monomer is suitably used according to the objects of the use of the vinyl chloride resin composition. Examples of the vinyl monomers are, for instance, an aromatic vinyl compound, an unsaturated nitrile, an alkyl acrylate, an alkyl methacrylate having an alkyl group with 9 or more carbon atoms, and the like. The vinyl monomer may be used alone or as an admixture thereof. When the amount of the vinyl monomer in the monomer mixture (A) is more than 20% by weight, the advantage of the present invention that the gelation property is improved is lost.

The monomer mixture (B) used in the preparation of the two-stage polymer (2) is a mixture of at least one monomer selected from the group consisting of an alkyl acrylate and an alkyl methacrylate other than methyl methacrylate and methyl methacrylate, and if necessary, a vinyl monomer copolymerizable with the alkyl acrylate and the alkyl methacrylate. The two-stage polymer (2) is prepared by adding such a monomer mixture (B) to the polymer latex prepared from the monomer mixture (A) and polymerizing the monomer mixture (B) in the presence of the polymer latex. When the thus obtained two-stage polymer (2) is added to the vinyl chloride resin (1) as the agent for improving processability, the aspect that the vinyl chloride resin which is not gelled remains can be avoided.

Any alkyl acrylate can be used without any limitation in the monomer mixture (B). Preferable alkyl acrylates are alkyl acrylates having $C_1$ to $C_8$ alkyl group. Examples of the alkyl acrylate are, for instance, methyl acrylate, ethyl acrylate, butyl acrylate, 2-ethylhexyl acrylate, and the like. Also, any alkyl methacrylate can be used without any limitation so long as the alkyl methacrylate is not methyl methacrylate in the monomer mixture (B). Preferable alkyl methacrylates other than methyl methacrylate are alkyl methacrylates having $C_2$ to $C_8$ alkyl group. Examples of the alkyl methacrylate other than methyl methacrylate are, for instance, ethyl methacrylate, butyl methacrylate, 2-ethylhexyl methacrylate, and the like. These alkyl acrylate and alkyl methacrylate other than methyl methacrylate may be used alone or as an admixture thereof. Among them, monomers capable of giving a two-stage polymer having a low glass transition temperature such as an alkyl acrylate with a $C_2-C_8$ alkyl group and an alkyl methacrylate with a $C_3-C_8$ alkyl group are particularly prepferable from the viewpoint of the attainment of the objects of the invention.

Examples of the vinyl monomer in the monomer mixture (B) are, for instance, an aromatic vinyl compound, an unsaturated nitrile compound, and the like. The vinyl monomer may be used alone or as an admixture thereof.

The monomer mixture (B) is composed of 80 to 20% by weight, preferably from 70 to 30% by weight, more preferably from 60 to 30% by weight of at least one monomer selected from the group consisting of the alkyl acrylate and the alkyl methacrylate other than methyl methacrylate and 20 to 80% by weight, preferably from 30 to 70% by weight, more preferably from 40 to 70% by weight of methyl methacrylate, and if necessary according to the objects of the use of the vinyl chloride resin composition, 0 to 20% by weight, preferably from 0 to 10% by weight of the vinyl monomer.

When the amount of methyl methacrylate is more than 80% by weight in the monomer mixture (B), the vinyl chloride resin which is not gelled remains. On the other hand, when the amount of methyl methacrylate is less than 20% by weight, the transparency that is the advantage of the vinyl chloride resin (1) is impaired.

The two-stage polymer (2) is composed of 60 to 95 parts by weight, preferably from 75 to 90 parts by weight, based on 100 parts by weight of the two-stage polymer (2) of the copolymer prepared from the monomer mixture (A) and 5 to 40 parts by weight, preferably from 10 to 25 parts by weight, based on 100 parts by weight of the two-stage polymer (2) of the copolymer prepared from the monomer mixture (B). When the amount of the copolymer prepared from the monomer mixture (A) is more than 95 parts by weight, the dispersibility of the two-stage polymer in the vinyl chloride resin is impaired, thus resulting in that the vinyl chloride resin which is not gelled remaines. On the other hand, when the amount is less than 60 parts by weight, the gelation property can be insufficiently improved.

One of the feature of the present invention is that the molecular weight of such a two-stage polymer (2) is high. That is, the specific viscosity ($\eta_{sp}$) at 30° C. of the solution wherein 0.4 g of the two-stage polymer (2) is dissolved in 100 ml of benzene is 1 or more, preferably 2 or more. Further, the particle size of the two-stage polymer (2) in the prepared emulsion-polymerization latex is not more than 1000 Å, preferably not more than 800 Å. Owing to the use of the thus two-stage polymer having the specific viscosity within the specific range as mentioned above and the particle size within the specific range as mentioned above, the composition of the present invention can exhibit the desired and excellent secondary processability and gelation property without impairing the excellent transparency that the vinyl chloride resin itself possesses originally. When the particle size of the two-stage polymer (2) is more than 1000 Å, the secondary processability and the transparency are impaired. When the specific viscosity is less than 1, in order to obtain the desired secondary processability and gelation property, a large amount of the two-stage polymer (2) must be added.

It is general that a particle size of a polymer in a latex tends to be large in an emulsion polymerization wherein an amount of a polymerization initiator is increased or a polymerization temperature is dropped for increasing the specific viscosity of the polymer. In the present invention, the polymer latex having the two-stage polymer whose particle size is relatively small as well as whose specific viscosity is relatively high is obtained by, for instance, deliberately increasing the amount of the emulsifier initially added. When using the latex of such a two-stage polymer (2) having the small particle size as the agent for improving processability, surprisingly, not only the transparency but also the processability and the secondary processability can be remarkably improved.

Since the two-stage polymer (2) has a structure wherein the polymer prepared from the monomer mixture (A) is covered with the layer of the polymer prepared from the monomer mixture (B), it can be avoided that the vinyl chloride resin which is not gelled remains when adding it to the vinyl chloride resin.

The two-stage polymer (2) can be prepared, for instance, by the following method:

The first stage emulsion polymerization is conducted in the presence of a suitable medium, emulsifier and polymerization initiator, using the monomer mixture (A) to give a latex containing the polymer prepared from the monomer mixture (A). Then, the monomer mixture (B) is added to the polymer latex and the polymerization of the monomer mixture (B) is conducted in the presence of the polymer latex. In the emulsion polymerization, water is usually used as the medium, a known anionic or nonionic surfactant is used as the emulsifier, and a usual water-soluble or oil-suluble polymerization initiator or water-soluble or oil-soluble redox polymerization initiator is used. Other polymerization conditions such as the polymerization time and the polymerization temperature are not particularly limited, and are suitably controlled so as to get a specific viscosity of the two-stage polymer (2) in the latex of 1 or more. For instance, there is exemplified as a general condition a polymerization condition wherein dioctyl sodium sulfosuccinate as the surfactant and about 0.02 part by weight of potassium persulfate as the polymerization initiator are added to 200 parts by weight of water and the polymerization system is kept at a temperature of about 65° C., to which about 100 parts by weight of the monomer mixture is continuously added over about 5 hours. Also, the amount of the emulsifier and the addition manner are suitably controlled so as to get the particle size of the two-stage polymer in the latex of not more than 1000 Å, preferably not more than 800 Å. Usually, there can be adopted a polymerization condition wherein dioctyl sodium sulfosuccinate is initially added in an amount of not less than about 0.5 part by weight and is further added in an amount of about 0.5 part by weight at the time when the half amount of the monomer mixture is added to the polymerization system and polymerized.

By the second stage polymerization of the monomer mixture (B), the layer of the polymer prepared from the monomer mixture (B) is formed around the surface of the polymer prepared from the monomer mixture (A).

From the obtained emulsion latex of the two-stage polymer, a polymer powder is obtained by adding a solution of a coagulant such as an aqueous solution of sulfuric acid, hydrochloric acid, sodium chloride or potassium chloride to the latex to coagulate and precipitate the polymer particles, and separting the powder in a usual separation manner such as centrifugation. If necessary, the obtained powder is thermally treated, washed, dehydrated and dried.

The vinyl chloride resin composition of the present invention can be obtained by blending the vinyl chloride resin (1) with the two-stage polymer (2) in a usual manner. The amount of the two-stage polymer (2) is from 0.1 to 30 parts by weight, preferably from 0.3 to 10 parts by weight based on 100 parts by weight of the vinyl chloride resin (1). When the amount of the two-stage polymer (2) is less than 0.1 part by weight, no satisfactory improvement of the processability is obtained. When it is more than 30 parts by weight, the excellent mechanical properties of the vinyl chloride resins are impaired.

The vinyl chloride resin composition of the present invention may contain usual additives used for vinyl chloride resins, such as a stabilizer, lubricant, agent for reinforcing impact resistance, plasticizer, coloring agent, filler and blowing agent, as occasion demands, when it is practically used.

The resin composition of the present invention can be formed into molded articles, for example, by blow molding, injection molding, calendering, profile extrusion and the like. The molded articles have excellent mechanical properties, a good transparency and an excellent secondary processability and are suitably used for the purposes such as plates and sheets. Accordingly, the composition of the present invention is suitably applicable to any field requiring the processing of vinyl chloride resins.

The present invention is more specifically described and explained by means of the following Examples, in which all parts and % are by weight unless otherwise noted. It is to be understood that the present invention is not limited to these Examples.

EXAMPLE 1

A reactor equipped with a stirrer was charged with 200 parts of water, 1 part of dioctyl sodium sulfosuccinate and 0.03 part of potassium persulfate, and oxygen is removed from the space of the reactor and water by introducing nitrogen into the reactor. The mixture was raised to a temperature of 65° C. with stirring, to which a monomer mixture (A) of 64 parts of methyl methacrylate and 16 parts of butyl methacrylate was added over 4 hours, and the polymerization reaction was continued for 1 hour with stirring while heating to substantially complete the polymerization reaction. Then, to the reaction mixture was added a monomer mixture (B) of 11 parts of butyl acrylate and 9 parts of methyl methacrylate over 1 hour, and the temperature of the mixture was kept at 65° C. for 1.5 hours, then the temperature was cooled down to 40° C.

A conversion of the polymerization was 99.2%. A particle size of two-stage polymer particles in the obtained emulsion polymerization latex measured by suspension method was 650 Å.

An aqueous solution of calcium chloride was added to the obtained latex to deposit (salt-out) the two-stage polymer, and the polymer powder was filtered off, washed with water and dried to give a sample (1) of the two-stage polymer.

A specific viscosity, $\eta_{sp}$ (a solution wherein 0.4 g of the two-stage polymer was dissolved in 100 ml of benzene was measured at 30° C., hereinafter the same) of the sample (1) was 3.00.

There was mixed 5 parts of the sample (1) with 100 parts of polyvinyl chloride (average degree of polymerization: 660), 1.5 parts of octyl tin mercaptide stabilizer, 1.5 parts of an epoxidated soybean oil, 1 part of butyl stearate and 0.5 part of a fatty acid ester of polyglycol to give a composition.

As to the obtained composition, the transparency, the secondary processability and the processability were measured and estimated as follows:

Transparency

The composition is kneaded for 5 minutes by rolls of 160° C., and is pressed at 170° C. for 15 minutes to give a test piece having a thickness of 5 mm. As to the obtained test piece, the total light transmittance (%) and the haze (%) are measured according to JIS-K-6714.

The results are shown in Table 1. The more excellent the transparency, the greater the result of the total light transmittance. Also, the more excellent the transparency, the smaller the result of the haze.

Secondary processability [Elongation at a high temperature (%)]

The composition is kneaded for 5 minutes by rolls of 160° C., and is pressed at 170° C. for 15 minutes to give a test piece having a thickness of 1 mm. As to the obtained test piece, the elongation at a high temperature is measured according to JIS-K-7113. As the dumbbel, Type 2 test piece is used, the elongation is measured at a temperature of 100° C. at a speed of testing of 250 mm/minute.

The results are shown in Table 1. The more excellent the secondary processability (in other words, the gelation of the vinyl chloride resin more progresses), the greater the results of the elongation at high temperature.

Processability

The processing test of the composition was conducted by using a Brabender plastograph at a mixing temperature of 160° C., using 55 g of the composition. That is, 55 g of the composition is continuously kneaded in the Brabender plastograph at 160° C. for 10 minutes after reaching the torque to the maximum value, then the mixture is taken out from the plastgraph and is pressed by rolls of 180° C. to give a sheet (30 cm × 30 cm) having a thickness of not more than 0.3 mm. The sheet is observed with the naked eye. (Fish eye)

Whether there are ones which are not gelled (fish eyes) on the sheet or not is shown in Table 1.
○ : There is no fish eye on the sheet.
X : There are fish eyes on the sheet.
XX : There are a lot of fish eyes on the sheet.

(Degree of gelation)

1: The sheet is uniform all over, and is excellent in gloss.
2: The sheet has partially ununiform parts (There are insufficiently kneaded parts).
3: The sheet has partially ununiform parts and is poor in gloss a litte
4: The half or more of the sheet has ununiform parts and the sheet is poor wholly in gloss.
5: The sheet is ununiform all over, the transparency is poor and there is no gloss.

The results are shown in Table 1.

Examples 2 and 3 and Comparative Examples 1–6

Each sample (2) to (8) of the two-stage polymers was prepared in the same manner as in Example 1 except that as to the samples (2) to (4), the amount of the polymerization initiator (potassium persulfate) was changed (increased) to an amount shown in Table 1 to lower $\eta_{sp}$ of the two-stage polymer, and as to the samples (5) to (8), only methyl methacrylate was used instead of the monomer mixture (A) of methyl methacrylate and butyl methacrylate as shown in Table 1, and the amount of the polymerization initiator was changed to an amount shown in Table 1 to lower $\eta_{sp}$ of the two-stage polymer. As to the samples (2) to (8), all of the particle sizes of the two-stage polymers in the obtained latexes were within the range of 500 to 700 Å.

The composition was prepared in the same manner as in Example 1 except that each of the sample (2) to (8) was used instead of the sample (1).

In Comparative Example 6, a composition was prepared in the same manner as in Example 1 except that a two-stage polymer was not used.

As to the obtained composition, the transparency, the secondary processability and the processability were measured and estimated in the same manner as in Example 1.

The results are shown in Table 1.

TABLE 1

|  |  | Ex. 1 | Ex. 2 | Ex. 3 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|
| Two-stage polymer (2) (Sample No.) |  | (1) | (2) | (3) | (4) | (5) | (6) | (7) | (8) | — |
| Component (A) (part) | MMA[*1] | 64 | 64 | 64 | 64 | 80 | 80 | 80 | 80 | — |
|  | BMA[*2] | 16 | 16 | 16 | 16 | — | — | — | — | — |
| Component (B) (part) | BA[*3] | 11 | 11 | 11 | 11 | 11 | 11 | 11 | 11 | — |
|  | MMA | 9 | 9 | 9 | 9 | 9 | 9 | 9 | 9 | — |
| Potassium persulfate (part) |  | 0.03 | 0.05 | 0.1 | 0.2 | 0.15 | 0.05 | 0.03 | 0.01 | — |
| $\eta_{sp}$ |  | 3.0 | 2.0 | 1.5 | 0.6 | 1.0 | 2.1 | 2.8 | 5.0 | — |
| Transparence |  |  |  |  |  |  |  |  |  |  |
| Total light transmittance (%) |  | 71.8 | 72.1 | 72.0 | 72.1 | 71.0 | 62.0 | 51.0 | 40.0 | 65.5 |
| Haze (%) |  | 15.1 | 15.0 | 15.0 | 15.0 | 15.5 | 19.0 | 19.5 | 26.0 | 19.4 |
| Elongation at a high temperature (%) |  | 650 | 630 | 550 | 300 | 400 | 430 | 390 | 330 | 150 |
| Processability |  |  |  |  |  |  |  |  |  |  |
| Fish eye |  | ○ | ○ | ○ | ○ | ○ | ○ | ○ | ○ | ○ |
| Degree of gelation |  | 1 | 1 | 2 | 3 | 3 | 2 | 3 | 4 | 5 |

(Notes)
[*1] Methyl methacrylate
[*2] Butyl methacrylate
[*3] Butyl acrylate

From the results of Table 1, it would be recognized that the compositions of Examples 1 to 3 containing the samples (1) to (3) of the two-stage polymers of the present invention are remarkably improved in processability and secondary processability with keeping the transparency excellent, compared to the composition of Comparative Example 1 containing the sample (4) of the two-stage polymer whose composition (kind and amount of ingredients) is within the range of the present invention but which is low in $\eta_{sp}$ (whose $\eta_{sp}$ is not within the range of the present invention).

Also, as to the compositions of Comparative Examples 2 to 5 containing the samples (5) to (8) of the two-stage polymers which are prepared by using only methyl methacrylate as the component (A) instead of the monomer mixture (A) of methyl methacrylate and butyl methacrylate in Exs. 1 to 3, the transparency and the secondary processability become poor with the increase of $\eta_{sp}$ of the two-stage polymer.

Examples 4 to 6 and Comparative Examples 7 to 10

The samples (9) to (15) of the two-stage polymers were, respectively, prepared in the same manner as in Example 1 except that a component (A) shown in Table 2 (the kinds and the amount of its ingredients being shown in Table 2) was used instead of the monomer mixture (A) of 64 parts of methyl methacrylate and 16 parts of butyl methacrylate. All of the two-stage polymers in the obtained latexes in Examples 4 to 6 and Comparative Examples 7 to 10 had a particle size of 500 to 750 Å.

A composition was prepared in the same manner as in Example 1 except that each of the samples (9) to (15) was used instead of the sample (1). As to the obtained composition, the transparency, the secondary processability and the processability were measured and estimated in the same manner as in Example 1. The results are shown in Table 2.

TABLE 2

|  |  | Ex. 1 | Ex. 4 | Ex. 5 | Ex. 6 | Com. Ex. 7 | Com. Ex. 8 | Com. Ex. 9 | Com. Ex. 10 |
|---|---|---|---|---|---|---|---|---|---|
| Two-stage polymer (2) (Sample No.) |  | (1) | (9) | (10) | (11) | (12) | (13) | (14) | (15) |
| Component (A) (part) | MMA | 64 | 64 | 70 | 45 | 64 | 64 | 20 | 70 |
|  | BMA | 16 | — | 8 | — | — | — | 60 | 2 |
|  | EMA[*1] | — | 16 | — | 35 | — | — | — | — |
|  | Dodecyc MA[*2] | — | — | — | — | — | 16 | — | — |
|  | BA | — | — | — | — | 16 | — | — | — |
|  | EA[*3] | — | — | — | — | — | — | — | 8 |
|  | AN[*4] | — | — | 2 | — | — | — | — | — |
| Component (B) (part) | BA | 11 | 11 | 11 | 11 | 11 | 11 | 11 | 11 |
|  | MMA | 9 | 9 | 9 | 9 | 9 | 9 | 9 | 9 |
| $\eta_{sp}$ |  | 3.0 | 2.9 | 3.0 | 3.2 | 3.2 | 2.8 | 2.9 | 3.1 |
| Transparency |  |  |  |  |  |  |  |  |  |
| Total light transmittance (%) |  | 71.8 | 71.6 | 71.5 | 72.0 | 65.0 | 60.2 | 50.0 | 58.0 |
| Haze (%) |  | 15.1 | 15.2 | 15.2 | 14.9 | 19.9 | 21.0 | 25.0 | 22.0 |
| Elongation at a high temperature (%) |  | 650 | 630 | 630 | 610 | 450 | 400 | 300 | 400 |
| Processability |  |  |  |  |  |  |  |  |  |
| Fish eye |  | ○ | ○ | ○ | ○ | ○ | ○ | ○ | ○ |
| Degree of gelation |  | 1 | 1 | 1 | 1 | 2 | 2 | 4 | 3 |

(Notes)
[*1] Ethyl methacrylate
[*2] Dodecyl methacrylate
[*3] Ethyl acrylate
[*4] Acrylonitrile From the results of Table 2, it would be recognized that all of the compositions of Examples 4 to 6 having the two-stage polymer prepared from as the component (A) the monomer mixture of methyl methacrylate and, as the copolymerizable component therewith, ethyl methacrylate or butyl methacrylate are remarkably excellent in transparency and secondary processability. On the other hand, as to the compositions of Comparative Examples 7 and 8, having the two-stage polymers prepared by using the alkyl acrylate (Com.Ex.4) and the alkyl acrylate having the alkyl group with not less than 8 carbon atoms (Com.Ex.5) respectively as the copolymerizable component with methyl methacrylate in the component (A), and the compositions of Comparative Examples 9 and 10, having the two-stage polymers wherein the amount of the alkyl methacrylate with the $C_2$ to $C_8$ alkyl group is not within the range of the present invention, all of them are poor in transparency and secondary processability.

Examples 7 to 11 and Comparative Examples 11 to 14

The samples of (16) to (24) of the two-stage polymers were, respectively, prepared in the same manner as in Example 1 except that a component (B) shown in Table 3 (kinds and amounts of its ingredients being shown in Table 3) was used instead of the monomer mixture of 11 parts of butyl acrylate and 9 parts of methyl methacrylate. All of the two-stage polymers in the obtained latexes in Examples 7 to 11 and Comparative Examples 11 to 14 had a particle size of 600 to 750 Å.

The composition was prepared in the same manner as in Example 1 except that each of the samples (16) to (24) was used instead of the sample (1). As to the obtained composition, the transparence, the secondary processability and the processability were measured and estimated in the same manner as in Example 1.

The results are shown in Table 3.

transparency is poor and a lot of fish eyes are generated on the sheet. Also, the composition of Comparative Example 14 wherein the amount of the component (B) to the component (A) is more than the amount prescribed in the present invention is poor in transparency, secondary processability and processability.

Example 12 and Comparative Examples 15 and 16

The samples (25) to (27) of the two-stage polymers having various particle sizes were, respectively, prepared in the same manner as in Example 1 except that the emulsifier (dioctyl sodium sulfosuccinate) was charged in the reactor in an amount shown in Table 3 and 0.2 part of the emulsifier was added at intervals of one hour until its total amount was 1 part.

The composition was prepared in the same manner as in Example 1 except that each of the samples (25) to (27) was used instead of the sample (1). As to the obtained composition, the transparency, the secondary processability and the processability were measured and estimated in the same manner as in Example 1.

The results are shown in Table 4.

TABLE 4

|  | Ex. 1 | Ex. 12 | Com. Ex. 15 | Com. Ex. 16 |
|---|---|---|---|---|
| Tow-stage polymer (2) (Sample No.) | (1) | (25) | (26) | (27) |
| Amount of the emulsifier initially charged in the reactor | 1.0 | 0.6 | 0.3 | 0.1 |
| Particle size of the polymer in the latex | 650 | 800 | 1250 | 1900 |
| $\eta_{sp}$ | 3.0 | 3.2 | 2.9 | 3.3 |
| Transparency |  |  |  |  |
| Total light transmittance (%) | 71.8 | 70.0 | 51.0 | 40.5 |
| Haze (%) | 15.1 | 16.1 | 20.0 | 25.6 |
| Elongation at a high temperature (%) | 650 | 610 | 420 | 300 |

TABLE 3

|  |  | Ex. 7 | Ex. 8 | Ex. 9 | Ex. 10 | Ex. 11 | Com. Ex. 11 | Com. Ex. 12 | Com. Ex. 13 | Com. Ex. 14 |
|---|---|---|---|---|---|---|---|---|---|---|
| Two-stage polymer (2) (Sample No.) |  | (16) | (17) | (18) | (19) | (20) | (21) | (22) | (23) | (24) |
| Component (A) | MMA | 74 | 74 | 74 | 55 | 65 | 74 | 74 | 90 | 40 |
| (part) | BMA | 6 | 6 | 6 | 10 | 27 | 6 | 6 | 7 | 10 |
| Component (B) | BA | 11 | — | 5 | — | 6 | 20 | — | 1 | 25 |
| (part) | EA | — | 15 | 8 | 10 | — | — | — | — | — |
| MMA | 2EHA*1 | — | — | — | — | — | — | — | — | — |
|  | BMA | — | — | — | 15 | — | — | — | — | — |
|  | AN | — | — | 2 | — | — | — | — | — | — |
|  | MMA | 9 | 5 | 5 | 10 | 2 | — | 20 | 2 | 25 |
| $\eta_{sp}$ |  | 3.1 | 3.2 | 3.2 | 3.4 | 3.0 | 3.2 | 3.3 | 3.2 | 3.0 |
| Transparence |  |  |  |  |  |  |  |  |  |  |
| Total light transmittance (%) |  | 71.0 | 71.2 | 71.0 | 70.0 | 71.5 | 60.5 | 61.5 | 63.0 | 50.8 |
| Haze (%) |  | 15.9 | 15.0 | 15.1 | 16.0 | 14.9 | 25.0 | 20.8 | 18.0 | 29.0 |
| Elongation at a high temperature (%) |  | 630 | 620 | 600 | 580 | 650 | 420 | 430 | 400 | 300 |
| Processability |  |  |  |  |  |  |  |  |  |  |
| Fish eye |  | O | O | O | O | O | X | XX | XX | O |
| Degree of gelation |  | 1 | 1 | 1 | 1 | 1 | 2 | 2 | 2 | 4 |

(Note)
*1 2-Ethylhexyl acrylate

From the results of Table 3, it would be recognized that as to the compositions of Comparative Examples 11 and 12 having the two-stage polymer prepared from as the component (B) only butyl acrylate (Com.Ex.11) or only methyl methacrylate (Com.Ex.12), and the composition of Comparative Example 13 wherein the amount of the component (B) to the component (A) is less than the amount prescribed in the present invention, the

| Processability |  |  |  |  |
|---|---|---|---|---|
| Fish eye | O | O | O | O |
| Degree of gelation | 1 | 1 | 2 | 3 |

From the results of Table 4, it would be recognized that the particle size of the two-stage polymer in the latex remarkably influences the transparency and the secondary processability of the composition. The compositions of Comparative Example 15 and 16 wherein the particle size of the two-stage polymer is not less than 1000 Å are not practically used.

The composition of the present invention is excellent in transparency and secondary processability as well as in processability. Such compositions having excellent properties can be prepared by admixing a small amount, such as 0.1 to 30 parts by weight of the two-stage polymer as the agent for improving the processability with 100 parts by weight of the vinyl chloride resin.

In addition to the ingredients used in the Examples, other ingredients can be used in the Examples as set forth in the specification to obtain substantially the same results.

What we claim is:

1. A vinyl chloride resin composition comprising:
   (1) 100 parts by weight of a vinyl chloride resin and
   (2) 0.1 to 30 parts by weight of a two-stage polymer, said polymer (2) being prepared by emulsion-polymerizing 60 to 95 parts by weight of a monomer mixture (A) of 50 to 95% by weight of methyl methacrylate, 5 to 50% by weight of an alkyl methacrylate with a $C_2$ to $C_8$ alkyl group and 0 to 20% by weight of a vinyl monomer copolymerizable therewith to give a polymer latex and then polymerizing 40 to 5 parts by weight of a monomer mixture (B) of 20 to 80% by weight of at least one monomer selected from the group consisting of an alkyl acrylate and an alkyl methacrylate other than methyl methacrylate, 80 to 20% by weight of methyl methacrylate and 0 to 20% by weight of a vinyl monomer copolymerizable therewith in the presence of said polymer latex, the total amount of said monomer mixture (A) and said monomer mixture (B) being 100 parts by weight; said polymer (2) having a particle size of not more than 1000 Å in the latex, and a specific viscosity at 30° C. of the solution wherein 0.4 g of said polymer (2) is dissolved in 100 ml of benzene of 2 or more.

2. The composition of claim 1, wherein said particle size of said polymer (2) in the latex is not more than 800 Å.

3. The composition of claim 1, wherein said alkyl methacrylate with $C_2$ to $C_8$ alkyl group in said monomer mixture (A) is butyl methacrylate.

* * * * *